United States Patent
Lewis et al.

(10) Patent No.: US 7,111,021 B1
(45) Date of Patent: Sep. 19, 2006

(54) SYSTEM AND METHOD FOR EFFICIENT SPACE ACCOUNTING IN A FILE SYSTEM WITH SNAPSHOTS

(75) Inventors: Blake H. Lewis, Los Altos Hills, CA (US); Andy C. Kahn, San Francisco, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 484 days.

(21) Appl. No.: 10/394,859

(22) Filed: Mar. 21, 2003

(51) Int. Cl.
*G06F 12/16* (2006.01)

(52) U.S. Cl. ...................... 707/202; 711/162
(58) Field of Classification Search ............... None
See application file for complete search history.

(56) References Cited

U.S. PATENT DOCUMENTS

| | | | |
|---|---|---|---|
| 4,570,217 A | 2/1986 | Allen et al. | |
| 5,163,131 A | 11/1992 | Row et al. | |
| 5,202,979 A | 4/1993 | Hillis et al. | |
| 5,278,979 A | 1/1994 | Foster et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,963,962 A | 10/1999 | Hitz et al. | |
| 6,038,570 A | 3/2000 | Hitz et al. | |
| 6,065,037 A | 5/2000 | Hitz et al. | |
| 6,425,035 B1 | 7/2002 | Hoese et al. | |
| 6,829,617 B1 * | 12/2004 | Sawdon et al. | 707/102 |
| 6,895,413 B1 * | 5/2005 | Edwards | 707/201 |
| 6,934,822 B1 * | 8/2005 | Armangau et al. | 711/162 |
| 2002/0091670 A1 * | 7/2002 | Hitz et al. | 707/1 |
| 2004/0205112 A1 * | 10/2004 | Margolus | 709/201 |

OTHER PUBLICATIONS

U.S. Appl. No. 10/100,967, Federwisch et al.
David Hitz et al. TR3002 File System Design for a NFS File Server Appliance published by Network Appliance, Inc.
Common Internet File System (CIFS) Version: CIFS-Spec 0.9, Storage Networking Industry Association (SNIA), Draft SNIA CIPS Documentation Work Group Work-in-Progress, Revision Date: Mar. 26, 2001.
Fielding et al. (1999) Request for Comments (RFC) 2616, HTTP/1.1.
Akyurek, Sedat, *Placing Replicated Data to Reduce Seek Delays*, Department of Computer Science, University of Maryland, UMIACS-TR-91-121, CS-TR-2746, Aug. 1991.
Bitton, Dina, *Disk Shadowing*, Proceedings of the 14$^{th}$ VLDB Conference, LA, CA 1988.
Chaudhuri, Surajit, et al., *Self-Tuning Technology in Microsoft SQL Server*, Data Engineering Journal 22, Feb. 1999 pp. 20-27.

(Continued)

*Primary Examiner*—Gary Portka
(74) *Attorney, Agent, or Firm*—Cesari and McKenna, LLP

(57) ABSTRACT

A system and method for implementing on-the-fly block ownership accounting of snapshots in a file system is provided. For each snapshot, including the current active file system, the number of blocks that the snapshot is the youngest and oldest owner of is computed and stored in non-volatile storage. As file system operations modify the file system and associated snapshots, the youngest and oldest owner counts are updated concurrently with the execution of the file system operations, thereby providing near instantaneous access to the count information for use by various file system commands.

38 Claims, 15 Drawing Sheets

OTHER PUBLICATIONS

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13):2:223-242 1981.

Hecht, Matthew S., et al., *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, Feb. 1999 pp. 33-40.

Kent, Jack et al., Optimizing Shadow Recovery Algorithms, *IEEE Transactions on Software Engineering*, 14(2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD RECORD (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering And Computer Sciences, Univ. of CA, presented at Summer'90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999, pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

\* cited by examiner

SYSTEM AND METHOD FOR EFFICIENT SPACE ACCOUNTING IN A FILE SYSTEM WITH SNAPSHOTS

FIELD OF THE INVENTION

The present invention relates to file systems and, more particularly, to block accounting in file systems having snapshots.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (lun).

In the example of the Write Anywhere File Layout (WAFL™) file system, by Network Appliance, Inc., of Sunnyvale, Calif., a file is represented as an inode data structure adapted for storage on disks. FIG. 1 is a schematic block diagram illustrating an exemplary on-disk inode 100, which preferably includes a meta data section 110 and a data section 150. The information stored in the meta data section 110 of each inode 100 describes a file and, as such, includes the type (e.g., regular or directory) 112 of the file, the size 114 of a file, time stamps (e.g., accessed and/or modification) 116 for the file and ownership, i.e., user identifier (UID 118) and group identifier (GID 120), of the file. The meta data section 110 further includes a xinode field 130 containing a pointer 140 that references another on-disk inode structure containing, e.g., access control list (ACL) information associated with the file or directory.

The inode 100 may also include a flags field 135 where various flags associated with the inode and the file system. The contents of the data section 150 of each inode may be interpreted differently depending upon the type of file (inode) defined within the type field 112. For example, the data section 150 of a directory inode contains meta data controlled by the file system, whereas the data section of a regular inode contains user-defined data. In this latter case the data section 150 includes a representation of the data associated with the file.

Specifically, the data section 150 of a regular on-disk inode may include user data or pointers, the latter referencing 4 kilobyte (KB) data block on disk used to store the user data. Each pointer is preferably a logical volume block number which is thereby facilitate efficiency among a file system and/or disk storage layer of an operating system when accessing the data on disks. Given the restricted size (e.g., 128 bytes) of the inode, user data having a size that is less than or equal to 64 bytes is represented in its entirety within the data section of an inode. However if the user data is greater than 64 bytes but less than or equal to 64 kilobytes (KB), then the data section of the inode comprises up to 16 pointers, each of which references a 4 KB block of data on disk. Moreover, if the size of the data is greater than 64 KB but less than or equal to 64 megabytes (MB), then each pointer in the data section 150 of the inode references an indirect inode that contains 1024 pointers, each of which references a 4 kilobyte data block on disk.

Some known file systems contain the capability to generate a snapshot of the file system. In the example of a WAFL-based file system, snapshots are described in TR3002 *File System Design for a NFS File Server Appliance* by David Hitz, et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., which are hereby incorporated by reference.

"Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other identifier that distinguishes it from other PCPIs taken at other points in time. A PCPI can also include other information (metadata) about the active file system at the particular point in time for which the image is taken. The terms "PCPI" and "snapshot" shall be used interchangeably through out this patent without derogation of Network Appliance's trademark rights.

When the file system generates a snapshot of a given file system, a snapshot inode is generated as shown in FIG. 3. The snapshot inode 305 is, in essence, a duplicate copy of the inode for the inode file 205 of the file system 200. Thus, the exemplary file system structure 200 includes the inode file indirect blocks 210, inodes 217, indirect blocks 219 and file data blocks 220A–C as in FIG. 2. When a user modifies a file data block, the file system layer writes the new data block to disk and changes the active file system to point to the newly created block.

FIG. 4 shows an exemplary inode file system structure 400 after a file data block has been modified. In this illustrative example, file data block 220C was modified to file data block 220C'. When file data block 220C is modified to file data block 220C', the contents of the modified file data block are written to a new location on disk as a function of the exemplary WAFL file system. Because of this new location, the indirect block 419 must be rewritten. Due to this changed indirect block 419, the inode 417 must be rewritten. Similarly, the inode file indirect block 410 and the inode for the inode file 405 must be rewritten. Thus, after a file data block has been modified the snapshot inode 305 contains a point to the original inode file indirect block 210 which in turn contains pointers through the inode 217 and an indirect block 219 to the original file data blocks 220A, 220B and 220C. However, the newly written indirect block 419 includes pointers to unmodified file data blocks 220A and 220B. The indirect block 419 also contains a pointer to the modified file data block 220C' representing the new arrangement of the active file system. A new inode for the inode file 405 is established representing the new structure 400. Note that metadata (not shown) stored in any snap-shotted blocks (e.g., 305, 210, and 220C) protects these blocks from being recycled or overwritten until they are released from all snapshots. Thus, while the active file system inode for the inode file 405 points to new blocks 220A, 220B and 220C', the old blocks 210, 217, 219 and 220C are retained until the snapshot is fully released.

After a snapshot has been created and file data blocks modified, the file system layer can reconstruct or "restore" the file system inode structure as it existed at the time of the snapshot by accessing the snapshot inode. By following the pointers contained in the snapshot inode 305 through the inode file indirect block 210, inode 217 and indirect block 219 to the unmodified file data blocks 220A–C, the file system layer can reconstruct the file system as it existed at the time of creation of the snapshot.

Storage operating systems implementing snapshots typically provide a command to enable a user or administrator to obtain information about snapshot consumption of available disk space. This command, which may be executed via a command line interface (CLI) or a graphical user interface (GUI), typically displays a percentage of the disk space utilized by the snapshots associated with the storage system. However, a noted disadvantage of the use of such a snapshot inquiry command is that a significant amount of time and processing power must be expended to compute the file system usage of each of the snapshots at the execution of the snapshot inquiry command. In some systems having many snapshots this time may exceed a half an hour.

Another noted disadvantage is that storage operating systems implementing snap-shots typically may not contain a mechanism to determine how many blocks have changed between any two snapshots. This information may be particularly useful in connection with certain mirroring (also termed "replication") techniques that utilize snap-shots as point in time images for reconciliation purposes. One example of such mirroring or replication techniques is described in U.S. patent application Ser. No. 10/100,967, entitled SYSTEM AND METHOD FOR DETERMINING CHANGES IN TWO SNAPSHOTS AND FOR TRANSMITTING CHANGES TO A DESTINATION SNAPSHOT, by Michael L. Federswitch, et al., the contents of which are hereby incorporated by reference.

SUMMARY OF THE INVENTION

The disadvantages of the prior art are overcome by providing a system and method for on-the-fly block ownership accounting. In accordance with the illustrative embodiment, an initial computation is made of the youngest and oldest owners of each of the snapshots of a respective storage system. In the illustrative embodiment, a snapshot is the youngest owner of a block if the snapshot uses the block and no newer snapshots, including the active file system, use the given block. Similarly, a snapshot is the oldest owner of a block if the snapshot uses the block and no older snapshots use the block. This youngest and oldest owner information is then stored in non-volatile storage, e.g., on-disk.

Once the initial information has been collected, the file system updates the youngest and oldest owner values in response to file system commands including, for example, the generation of a snapshot, the deletion of a snapshot, the allocation of a block, and/or the freeing of a block. Therefore, processes or applications that require such snap-shot information may easily obtain the information by reading up to date values from the non-volatile storage medium. By using the teachings of the present invention, commands, such as the above-described snapshot consumption command, may be executed in a matter of seconds or less instead of minutes or hours. Similarly, mirroring proecedures may easily obtain counts of number of blocks owned by certain snapshots in a time-efficient manner.

BRIEF DESCRIPTION OF THE DRAWINGS

The above and further advantages of the invention may be better understood by referring to the following description in conjunction with the accompanying drawings which like reference numerals indicate identically or functionally similar elements of which.

DETAILED DESCRIPTION OF AN
ILLUSTRATIVE EMBODIMENT

A. Storage System Environment

Figure 1:
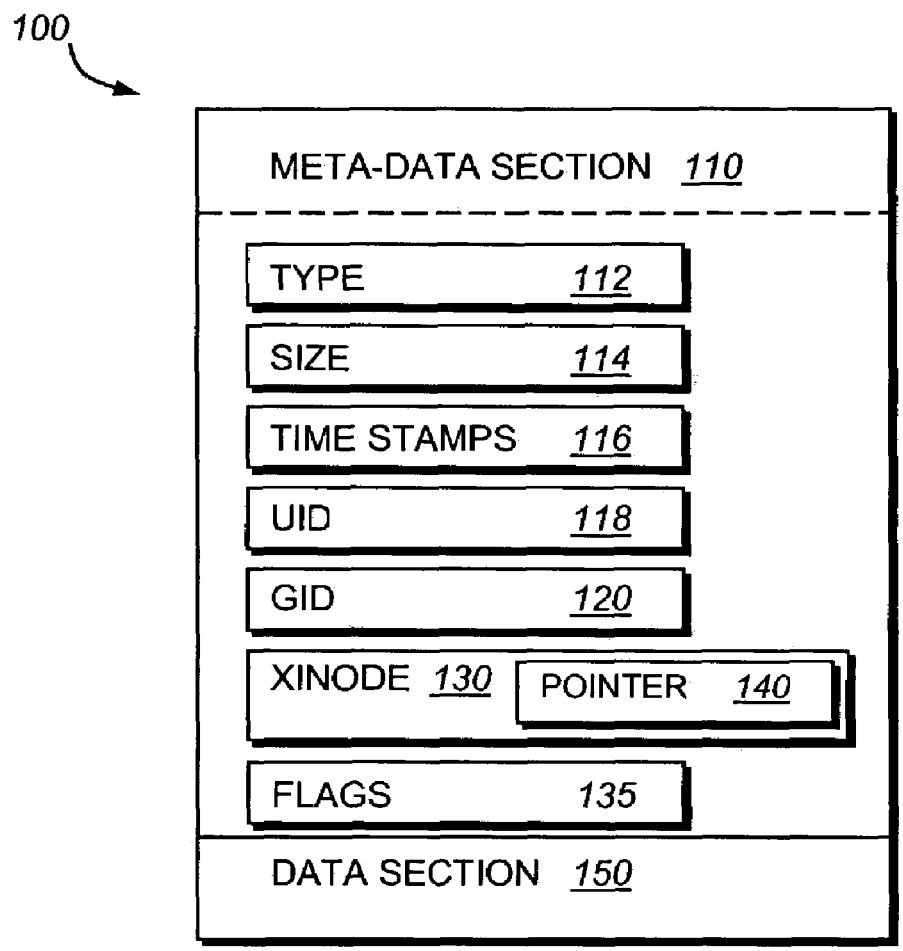
FIG. 1 is a schematic block diagram of an exemplary inode in accordance with an embodiment of the present invention.
Figure 2:
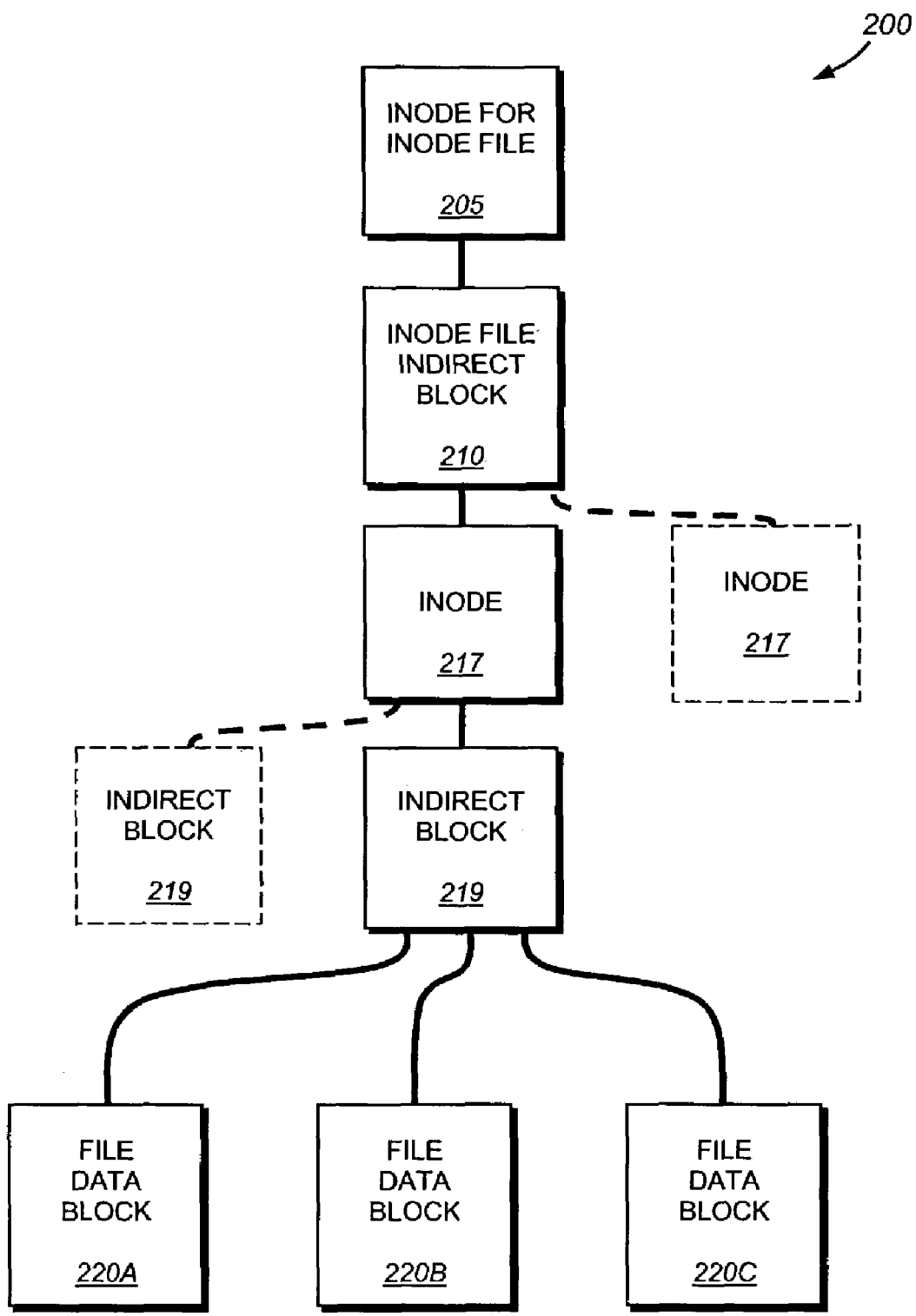
FIG. 2 is a schematic block diagram of an exemplary inode tree.
Figure 3:
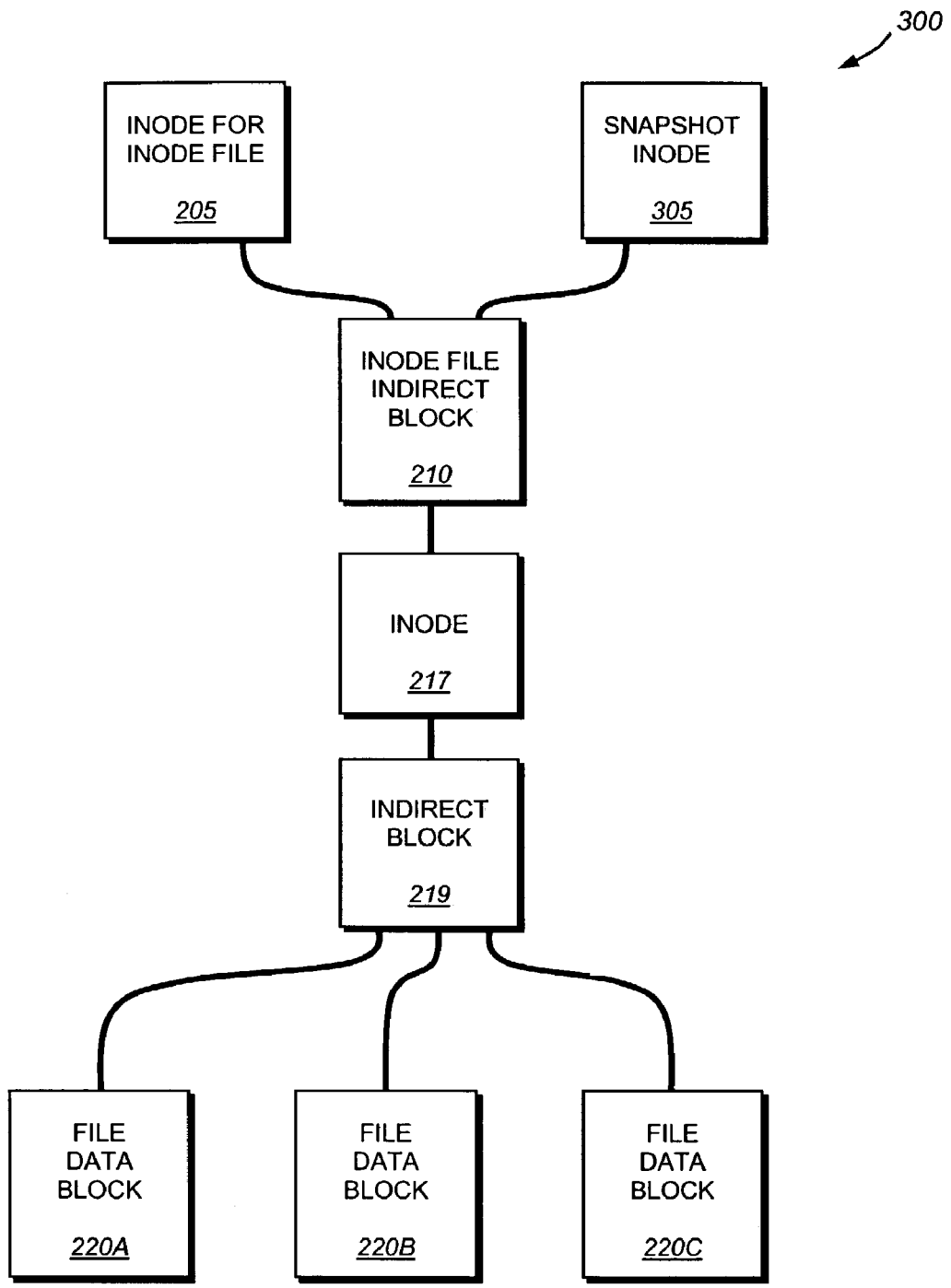
FIG. 3 is a schematic block diagram of an exemplary inode tree showing a snap-shot inode.
Figure 4:
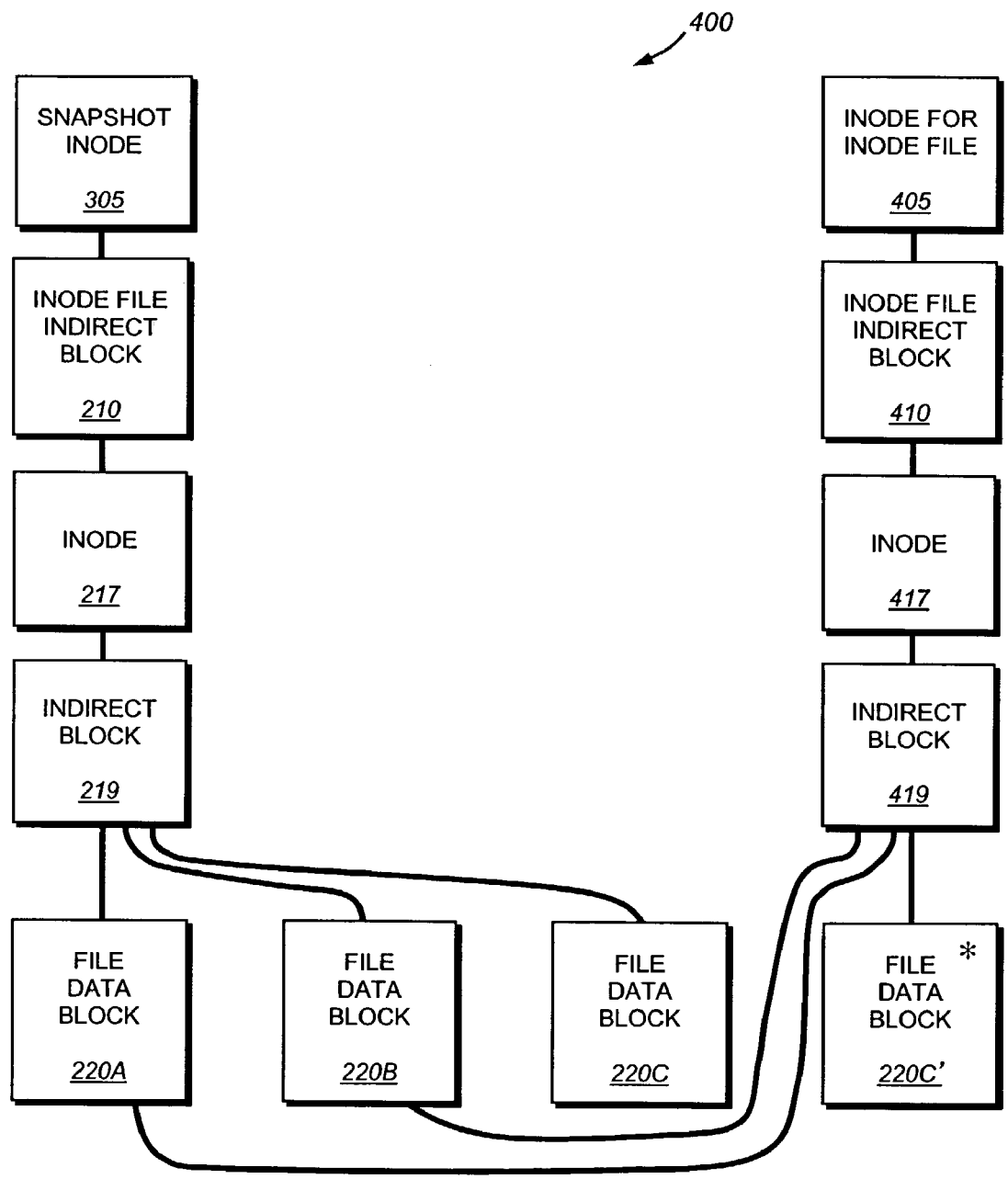
FIG. 4 is a schematic block diagram of an exemplary inode tree and snapshot inode tree showing data being written to a file after a snapshot was generated.
Figure 5:
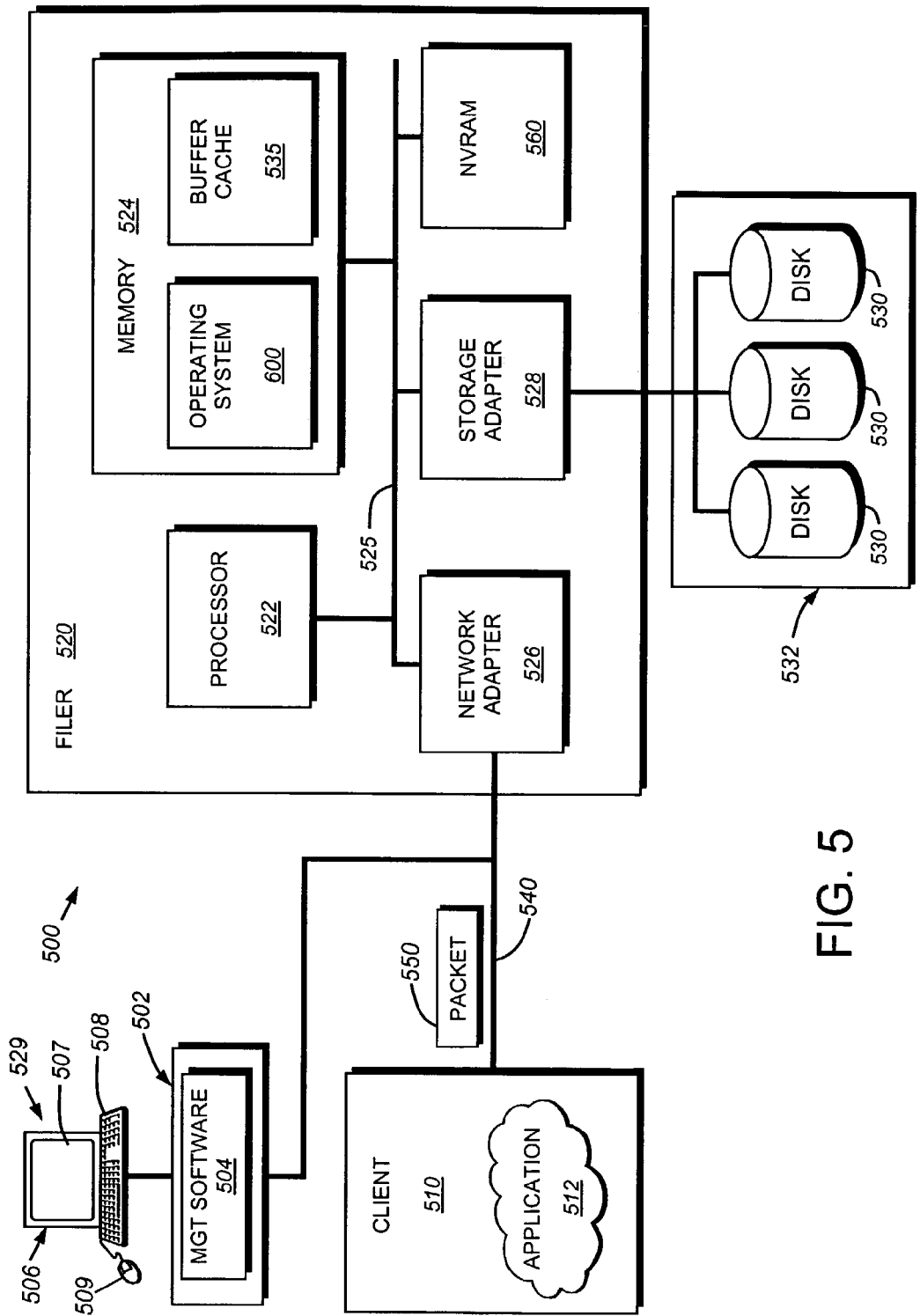
FIG. 5 is a schematic block diagram of an exemplary file server environment in accordance with an embodiment of the present invention.

By way of further background, FIG. 5 is a schematic block diagram of a storage system environment 500 that includes a client 510 having one or more applications 512, and an interconnected file server 520 that may be advantageously used with the present invention. The filer server or "filer" 520 is a computer that provides file service relating to the organization of information on storage devices, such as disks 530. It will be understood to those skilled in the art that the inventive technique described herein may apply to any type of special-purpose computer (e.g., server) or general-purpose computer, including a standalone computer. The filer 520 comprises a processor 522, a memory 524, a network adapter 526 and a storage adapter 528 interconnected by a system bus 525. The filer 520 also includes a storage operating system 600 that implements a file system to logically organize the information as a hierarchical structure of directories and files on the disks. A console or other user interface 529 is provided to control various filer functions, including those implemented according to this invention, and report on the status of filer operations.

It will be understood to those skilled in the art that the inventive technique described herein may apply to any type of special-purpose computer (e.g., file serving appliance) or general-purpose computer, including a standalone computer, embodied as a storage system. To that end, filer 520 can be broadly, and alternatively, referred to as storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory 524 comprises storage locations that are addressable by the processor and adapters for storing software program code. A portion of the memory may be further organized as a "buffer cache" 535 for storing data structures that are passed between disks and the network during normal runtime operation. The memory comprises a form of random access memory (RAM) that is generally cleared by a power cycle or other reboot operation (e.g., it is a "volatile" memory). The processor and adapters may, in turn, comprise processing elements and/or logic circuitry configured to execute the software code and manipulate the data structures. The operating system 600, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 526 comprises the mechanical, electrical and signaling circuitry needed to connect the filer 520 to a client 510 over a computer network 540, which may comprise a point-to-point connection or a shared medium, such as a local area network. The client 510 may be a general-purpose computer configured to execute applications 512, such as a database application. Moreover, the client 510 may interact with the filer 520 in accordance with a client/server model of information delivery. That is, the client may request the services of the filer, and the filer may return the results of the services requested by the client, by exchanging packets 550 encapsulating, e.g., the CIFS protocol or NFS protocol format over the network 540.

The storage adapter 528 cooperates with the operating system 600 executing on the filer to access information requested by the client. The information may be stored on the disks 530 of a disk shelf 532 that is attached, via the storage adapter 528 to the filer 520 or other node of a storage system as defined herein. The storage adapter 528 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 522 (or the adapter 528 itself) prior to being forwarded over the system bus 525 to the network adapter 526, where the information is formatted into a packet and returned to the client 510.

In one exemplary filer implementation, the filer 520 can include a nonvolatile random access memory (NVRAM) 560 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

Connected to the LAN 540 may be a station using which a maintenance operator can interface with the system. A management station 502 can include a server or PC-based computer in a console 529 with a network interface for communicating over the LAN 540. Within the management station 502, resides appropriate management software 504. A graphical user interface (GUI) 506 may include a display 507, a keyboard 508 and a mouse 509 so that a maintenance operator can enter commands into the system.

In an illustrative embodiment, the disk shelf 532 is arranged as a plurality of separate disks 530. The disk shelf 532 may include, in some embodiments, dual connectors for redundant data paths. The disks 530 are arranged into a plurality of volumes, each having a file system associated therewith. The volumes each include one or more disks 530. In one embodiment, the physical disks 530 are configured into RAID groups so that some disks store striped data and some disks store separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

B. Storage Operating System

To facilitate generalized access to the disks 530 on the array 532, the storage operating system 600 (FIG. 6) implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. As noted above, in the illustrative embodiment described herein, the storage operating system is the NetApp® Data ONTAP™ operating system available from Network Appliance, Inc., that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Again to summarize, as used herein, the term "storage operating system" generally refers to the computer-executable code operable on a storage system that manages data access and, in the case of a file server, implements file system semantics (such as the above-referenced WAFL). In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 6:
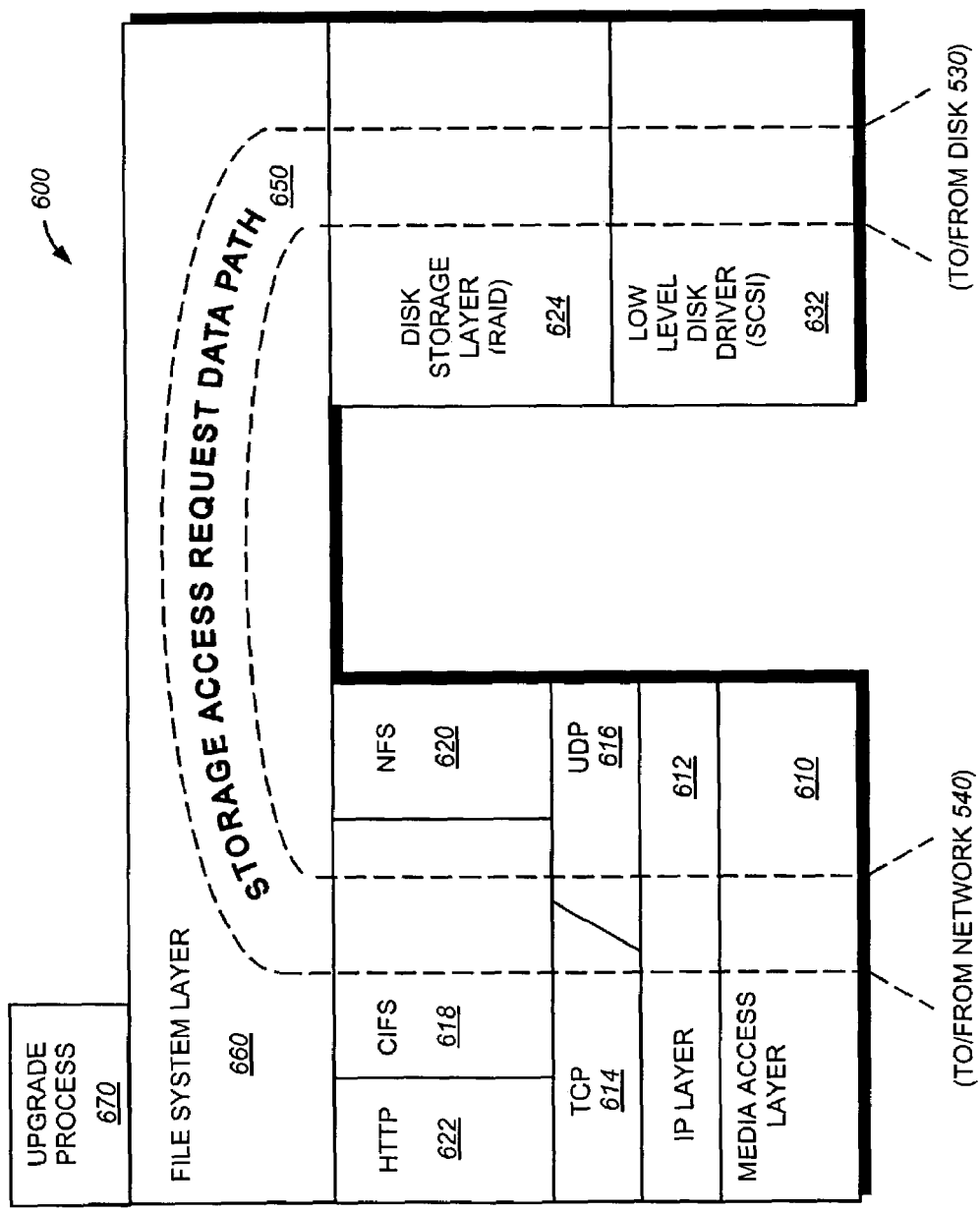
FIG. 6 is a schematic block diagram of an exemplary storage operating system in accordance with an embodiment of the present invention.

The organization of the preferred storage operating system for the exemplary filer is now described briefly. However, it is expressly contemplated that the principles of this invention can be implemented using a variety of alternate storage operating system architectures. As shown in FIG. 6, the storage operating system 600 comprises a series of software layers, including a media access layer 610 of network drivers (e.g., an Ethernet driver). The operating system further includes network protocol layers, such as the Internet Protocol (IP) layer 612 and its supporting transport mechanisms, the Transport Control Protocol (TCP) layer 614 and the User Datagram Protocol (UDP) layer 616. A file system protocol layer provides multi-protocol data access and, to that end, includes support for the CIFS protocol 618, the NFS protocol 620 and the Hypertext Transfer Protocol (HTTP) protocol 622. In addition, the storage operating system 600 includes a disk storage layer 624 that implements a disk storage protocol, such as a RAID protocol, a disk configuration verification layer 626, a disk driver layer 628, a storage disk manager layer 630 and a low-level disk driver that implements a disk control protocol such as the small computer system interface (SCSI) 632.

Bridging the disk software layers with the network and file system protocol layers is a file system layer 660 of the storage operating system 600. Generally, the layer 660 implements a file system having an on-disk format representation that is block-based using, e.g., 4-kilobyte (KB) data blocks and using inodes to describe the files. Note that while files are implemented in an illustrative embodiment, the term "file" should be taken broadly to include any type of data organization or "data container", including those used by block-level protocols, such as SCSI. The term "data container" will therefore be used interchangeably for files herein. As used herein, a file system is a programmatic entity that imposes structure on the address space of one or more physical or virtual disks so that the storage operating system may conveniently deal with data containers, including files. An "active file system" is a file system to which data can be both written and read, or, more generally, an active store that responds to both read and write I/O operations. Similarly, a snapshot is a reference store or image of the file system at a point in time that is typically read-only.

Before proceeding with a more detailed description of the illustrative embodiment, the following definitions are provided. The term "data container", as noted above, shall refer generally to a file, LUN (logical unit number), or any other separately or individually addressable data structure or logical group of data blocks residing on persistent storage. The term "volume" in this context shall refer to a logical group of data containers. The term "directory" shall refer to an organizational structure that facilitates access to a given data container through traversal of trees or other logical indexing structures. Likewise, the term "pathway" or "path" shall refer to the route taken by the storage operating system through the directory structure in addressing the data container. In addition, it is expressly contemplated that the teachings of the present invention can be applied to a variety of storage environments and data types including, but not limited to, file data, database data and/or block-level data.

In response to transaction requests, the file system generates operations to load (retrieve) the requested data from volumes if it is not resident "in-core", i.e., in the filer's memory 524. If the information is not in memory, the file system layer 660 indexes into the inode file using the inode number to access an appropriate entry and retrieve a logical volume block number. The file system layer 660 then passes the logical volume block number to the disk storage (RAID) layer 624, which maps that logical number to a disk block number and sends the latter to an appropriate driver (for example, an encapsulation of SCSI implemented on a fibre channel disk interconnection) of the disk driver layer 626. The disk driver accesses the disk block number from volumes and loads the requested data in memory 524 for processing by the filer 520. Upon completion of the request, the filer (and storage operating system) returns a reply, e.g., a conventional acknowledgement packet defined by the Common Internet File System (CIFS) specification, to the client 510 over the network 540.

It should be noted that the software "path" 650 through the storage operating system layers described above needed to perform data storage access for the client request received at the filer may alternatively be implemented in hardware or a combination of hardware and software. That is, in an alternate embodiment of the invention, the storage access request data path 650 may be implemented as logic circuitry embodied within a field programmable gate array (FPGA) or an application specific integrated circuit (ASIC). This type of hardware implementation increases the performance of the file service provided by filer 520 in response to a file system request packet 550 issued by client 510.

C. On-the-Fly Ownership Accounting

To utilize the on-the-fly block allocation of the present invention, it is required that an initial calculation of the number of blocks that are associated with each snapshot be performed. This initial calculation may be performed in an identifcal manner to the determination made by the conventional snapshot inquiry command utilized by a storage operating system. However, in the illustrative embodiment this calculation is performed by a snapshot upgrade process executing as part of the storage operating system.

This upgrade process calculates the initial youngest and oldest owner values for each snapshot, thereby establishing baseline values that are then updated on-the-fly by the novel procedures described further below. This upgrade process, which only needs to be executed when converting a file system to accommodate on-the-fly block accounting, typically executes as a background process on the storage system.

Initialization

Figure 7:
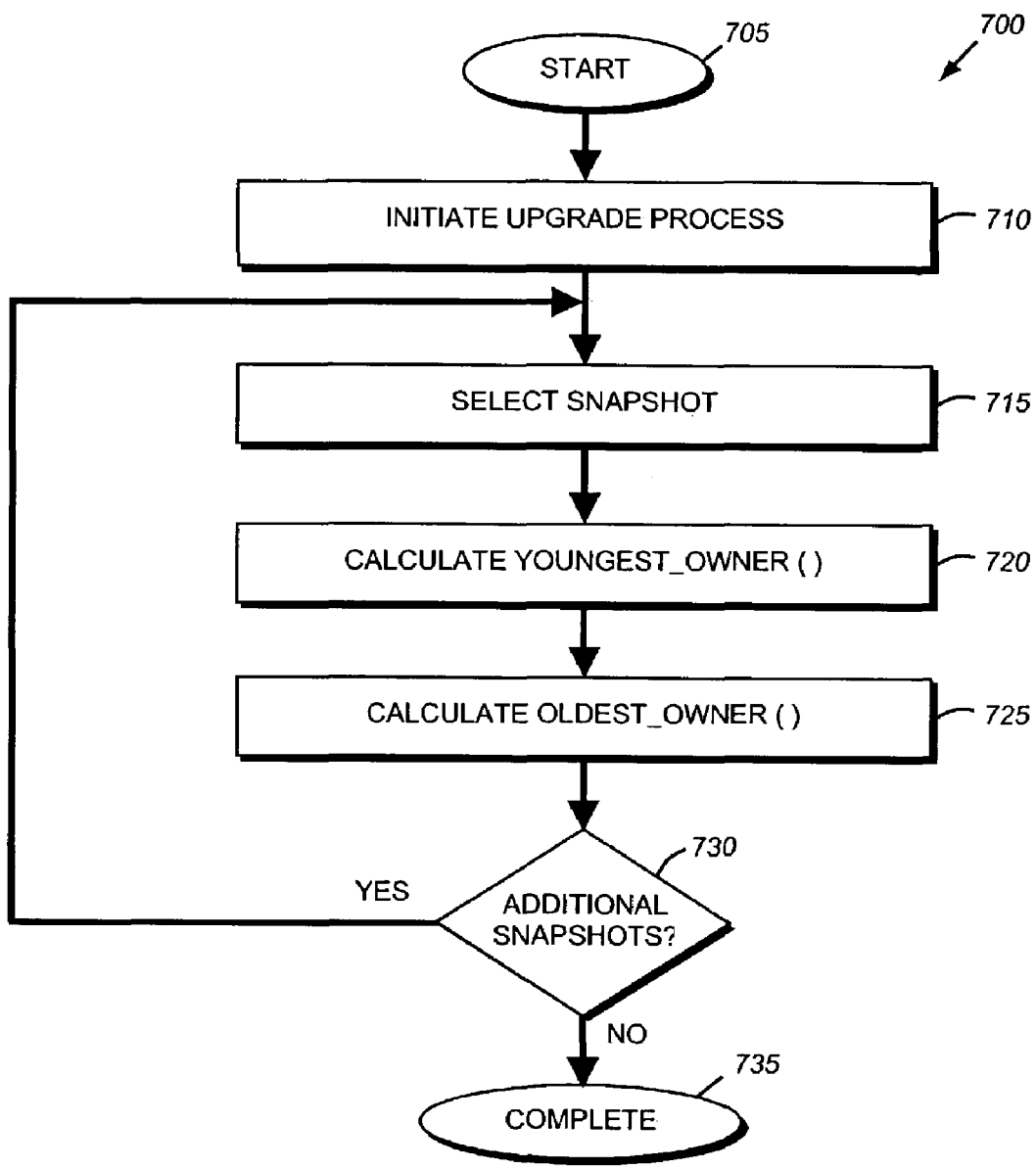
FIG. 7 is a flowchart detailing the steps of a procedure performed by a snapshot upgrade process in accordance with an embodiment of the present invention.

FIG. 7 shows the steps of a procedure 700 performed by the illustrative snapshot upgrade process in an exemplary embodiment of the present invention. It should be noted that during the upgrade process, the on-the-fly block accounting is performed for those blocks that have already been processed by the upgrade process. Thus, once a block has been processed, the on-the-fly update procedures described further below, will operate to maintain and update the appropriate youngest and oldest owner counts. The procedure begins in step 705 and proceeds to step 710 where a user or administrator initiates the upgrade process. This initiation of the upgrade process (670 in FIG. 6) may occur, for example, by the user installing a new version of the storage operating system or by activating the on-the-fly block allocation tracking feature of the storage operating system. The procedure 700 then selects a snapshot for calculation in step 715. It should be noted that the active file system is considered a snapshot for the purposes of this procedure, as the active file system is also a point in time representation of the state of the file system. Each snapshot in a file system has a unique SnapshotID associated with it that is used by the file system for various functions. In the illustrative embodiment, the active file system is assigned a SnapshotID of 0.

Once the procedure has selected a snapshot in step 715, the procedure then calculates the youngest owner value for the selected snapshot in step 720. As used herein, the number of blocks that have the snapshot with SnapshotID of N as the "youngest" owner is represented by Youngest_owner(N). Thus, Youngest_Owner(0) represents the number of blocks that have the active file system (SnapshotID 0) as their youngest owner. A snapshot is the youngest owner of a given block if it uses the block and no newer snap-shots, including the active file system, are using the given block. This calculation is performed using the conventional youngest owner technique, namely by examining a block map stored by the file system. The Youngest_Owner( ) value is also written to some form of non-volatile media, e.g., disk. In the illustrative embodiment, the Youngest_Owner( ) value is written to the file system information (FSinfo) block associated with the snapshot. The FSinfo block includes various meta data for use by the file system in managing the snapshot and/or active file system.

Similarly, in step 725, the "oldest" owner value is calculated for the selected snapshot. The oldest owner of a given block is a snapshot that uses the block and no older snap-shots use the block (e.g., snapshots taken further back in time). Thus, for example, if a block is newly allocated, its oldest owner is the active file system (SnapshotID 0) as no older snapshots use the newly allocated block. As used herein, the number of blocks that have the snapshot with SnapshotID of N as their oldest owner is represented by Oldest_Owner(N). As in step 720, the Oldest_Owner( ) value is also written to the FSinfo block associated with the selected snapshot. The procedure then continues to step 730 where it determines whether there are additional snapshots to calculate the youngest and oldest owner values. If there are no additional snapshots, the procedure then completes in step 735. Otherwise, if there are additional snapshots, the procedure loops back to step 715 where it selects another snapshot to calculate the youngest and oldest owner values.

At the completion of procedure 700, each snapshot, including the active file system, will have the Youngest_Owner( ) and Oldest_Owner( ) values stored in non-volatile memory. As noted above, in the illustrative embodiment, these values are stored in the file system information (FSinfo) block associated with the snapshot. In the illustrative WAFL file system, each root inode of either the active file system or of a snapshot has an associated file system information block (FSinfo block).

On the Fly Accounting

Figure 8:
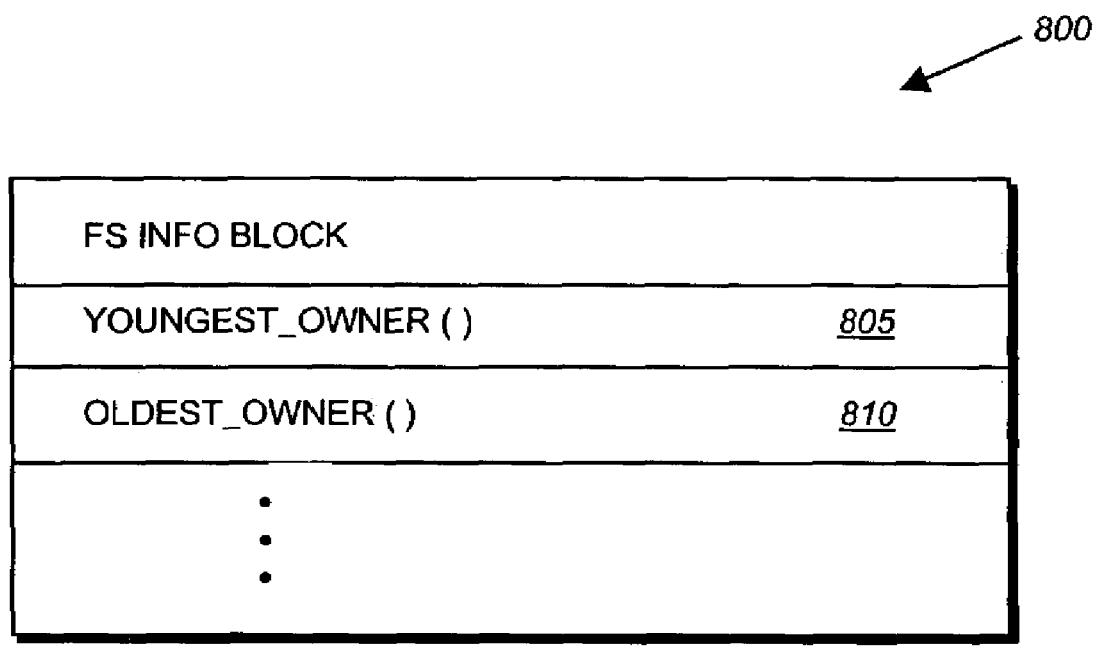
FIG. 8 is an exemplary schematic block diagram of an illustrative file system information block in accordance with an embodiment of the present invention.

FIG. 8 is an exemplary block diagram of a file system information (FSinfo) block 800 that may be utilized in accordance with the present invention. In the exemplary embodiment, the FSinfo block 800 includes a field for the Youngest_Owner( ) count 805 and a field for the Oldest_Owner( ) count 810. The Youngest_Owner( ) count 805 field is used by the storage operating system, and more specifically, in the illustrative embodiment, the file system, to store the current Youngest_Owner( ) count associated with the snapshot related to this FSinfo block. Similarly, the Oldest_Owner( ) count 810 field is used by the file system to store the current Oldest_Owner( ) values for the snapshot associated with the FSinfo block.

FIGS. 9–12, described further below, detail various block accounting procedures performed in the illustrative embodiment, in response to various file system operations. It should be noted that procedures 900–1200 require that if a block is used by any snapshot other than the active file system, the block may not be then allocated in the active file system. As used herein, the term "Snapshot ID" refers to the snapshot identifier associated with the snapshot being used by the in-progress operation. For example, with reference to procedure 900, described below, Snapshot ID refers to the snapshot identifier of the newly created snapshot.

Figure 9:
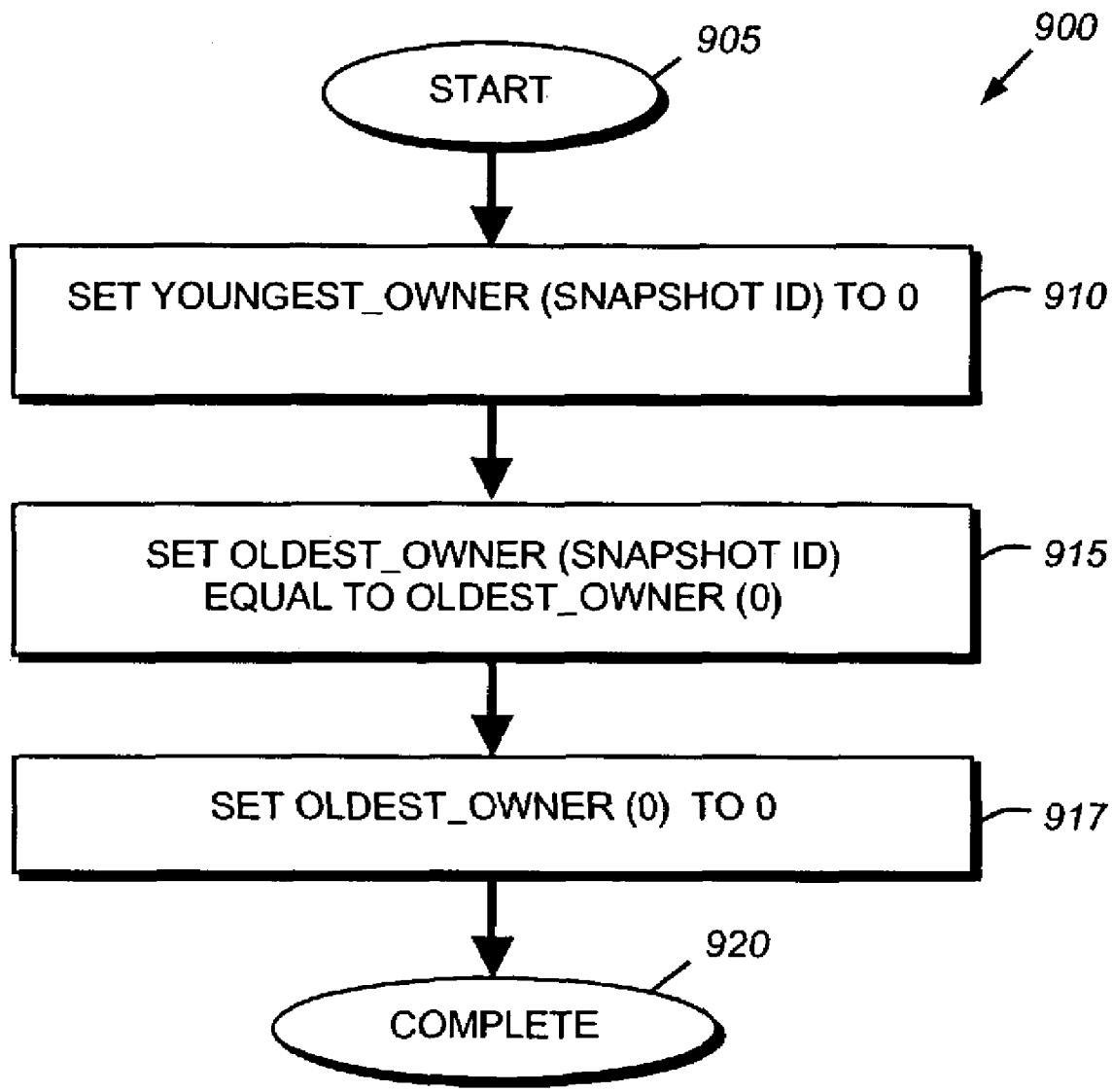
FIG. 9 is a flowchart detailing the steps of a procedure performed in response to the creation of a snapshot in accordance with an embodiment of the present invention.

FIG. 9 is a flowchart detailing the steps of a procedure 900 performed, in the illustrative embodiment, by the file system when a snapshot is created. The procedure 900 is performed, in the illustrative embodiment, during the creation of a snapshot by the file system. The procedure begins in step 905 and continues to step 910 where the Youngest_Owner (SnapshotID) value is set to 0. As noted above, the SnapshotID of the active file system is 0. Thus, the result of step 910 is to indicate that the newly created snapshot is not the youngest owner of any blocks as all blocks in the newly created snapshot are also owned by the active file system, which is considered to be the youngest of all snapshots. Next, the procedure, in step 915, sets the Oldest_Owner (SnapshotID) equal to the value of Oldest_Owner (0). Thus, at the creation of a new snapshot, the number of blocks that have this newly created snapshot as their oldest owner is equal to the number of blocks that had the active file system as their oldest owner. The procedure then, in step 917, sets the value of Oldest_Owner(0) to zero. Thus, after the creation of a snapshot, the active file system is not the oldest owner of any blocks. The procedure is then complete in step 920.

Figure 10:
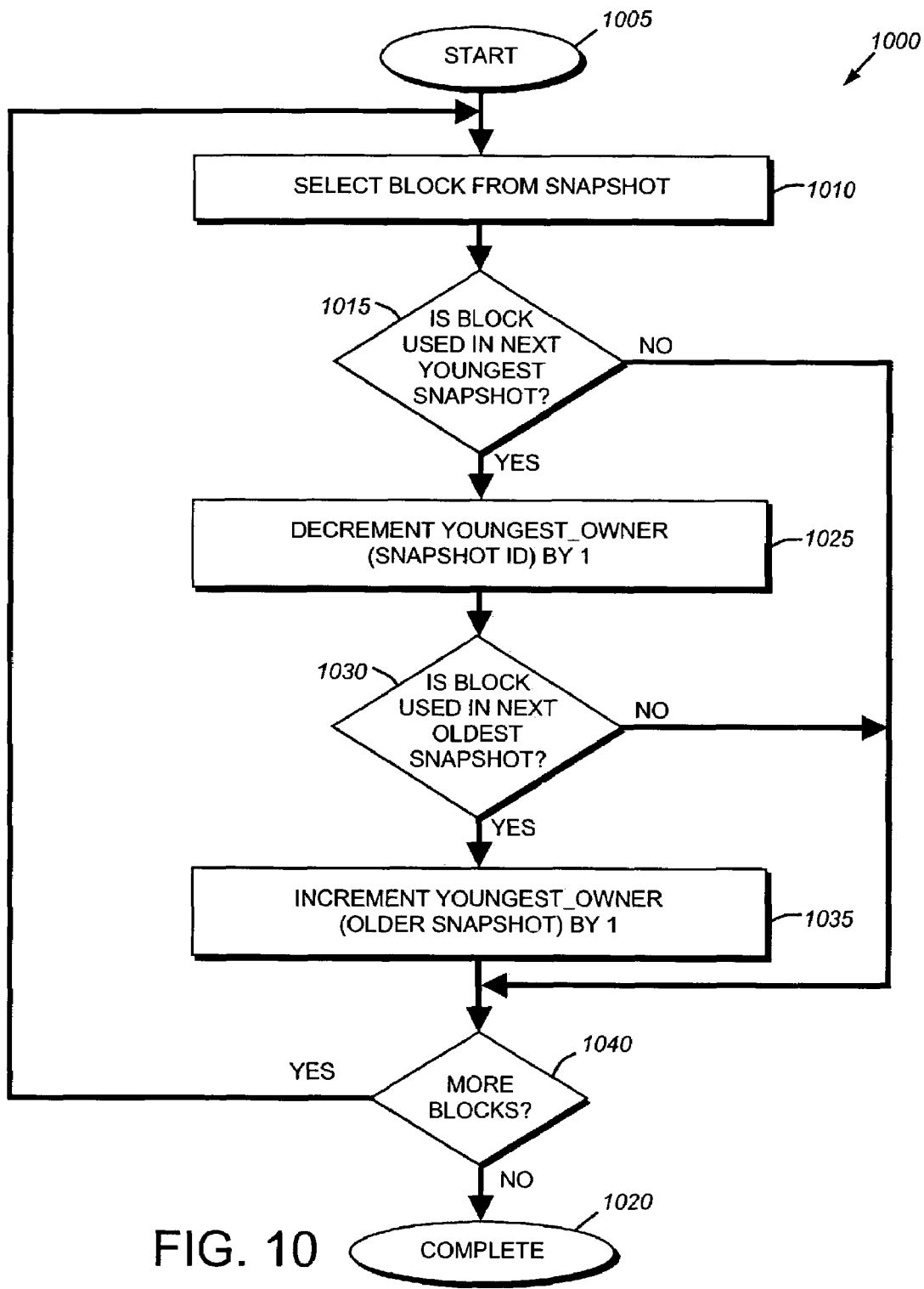
FIG. 10 is a flowchart detailing the steps of a procedure performed when deleting a snapshot in accordance with an embodiment of the present invention.

FIG. 10 is a flowchart of a procedure 1000 performed to calculate youngest owner values when deleting a snapshot. This procedure 1000 accounts for the blocks contained in the deleted snapshot and updates the appropriate youngest owner values of the snapshots preceding the deleted snapshot. The procedure begins in step 1005 and proceeds to step 1010 where a block from the deleted snapshot is selected. A determination is then made, in step 1015, whether the selected block is used in the next youngest snapshot. If the block is used in the next youngest snapshot, the procedure continues to step 1025 where the Youngest_Owner(SnapshotID) is decremented by 1.

The procedure then determines, in step 1030, whether the block is used in the next oldest snapshot. If the block is used in the next oldest snapshot, the procedure increases Youngest_Owner(Older Snapshot) by 1 in step 1035. The procedure continues to step 1040 where it determines if there are additional blocks to account for in the snapshot. If there are additional blocks, then the procedure loops back to step 1010 and selects another block. Otherwise, the procedure completes in step 1020. If the block is not used in the next youngest snapshot (step 1015) or is not used in the next oldest snapshot (step 1030), the procedure will branch to step 1040 to determine if additional blocks exist.

Figure 11:
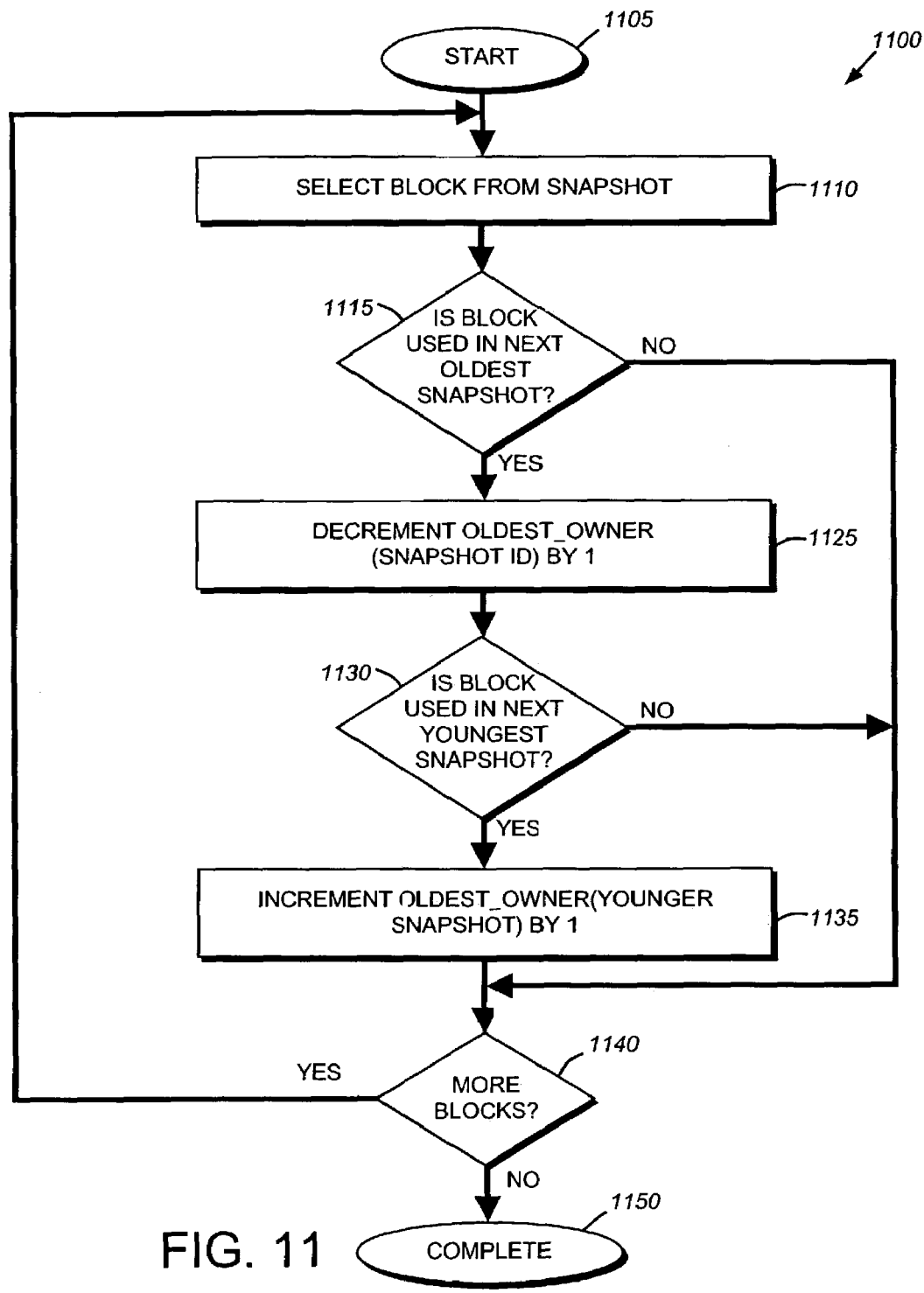
FIG. 11 is a flowchart detailing the steps of a procedure performed to calculate the oldest owner values when deleting a snapshot in accordance with an embodiment of the present invention.

FIG. 11 is a flowchart of the steps of a procedure 1100 performed to calculate the oldest owner values when deleting a snapshot. The procedure begins in step 1105 and proceeds to step 1110 where a block is selected from the snapshot. Then, in step 1115, a determination is made as to whether the block is used in the next oldest snapshot. If the block is not used in the next oldest snapshot, the procedure continues to step 1125 where the value of Oldest_Owner (SnapShot ID) is decremented by 1. Then, the procedure determines if the block is used in the next youngest snapshot in step 1130. If the block is used in the next youngest snapshot, the procedure continues to step 1135 where the value of Oldest_Owner(YoungerSnapshot) is increased by 1. The procedure then, in step 1140, determines if additional blocks need to be updated in the snapshot. If additional blocks need to be processed, the procedure loops back to step 1110. Otherwise, the procedure is complete (step 1150).

Figure 12:
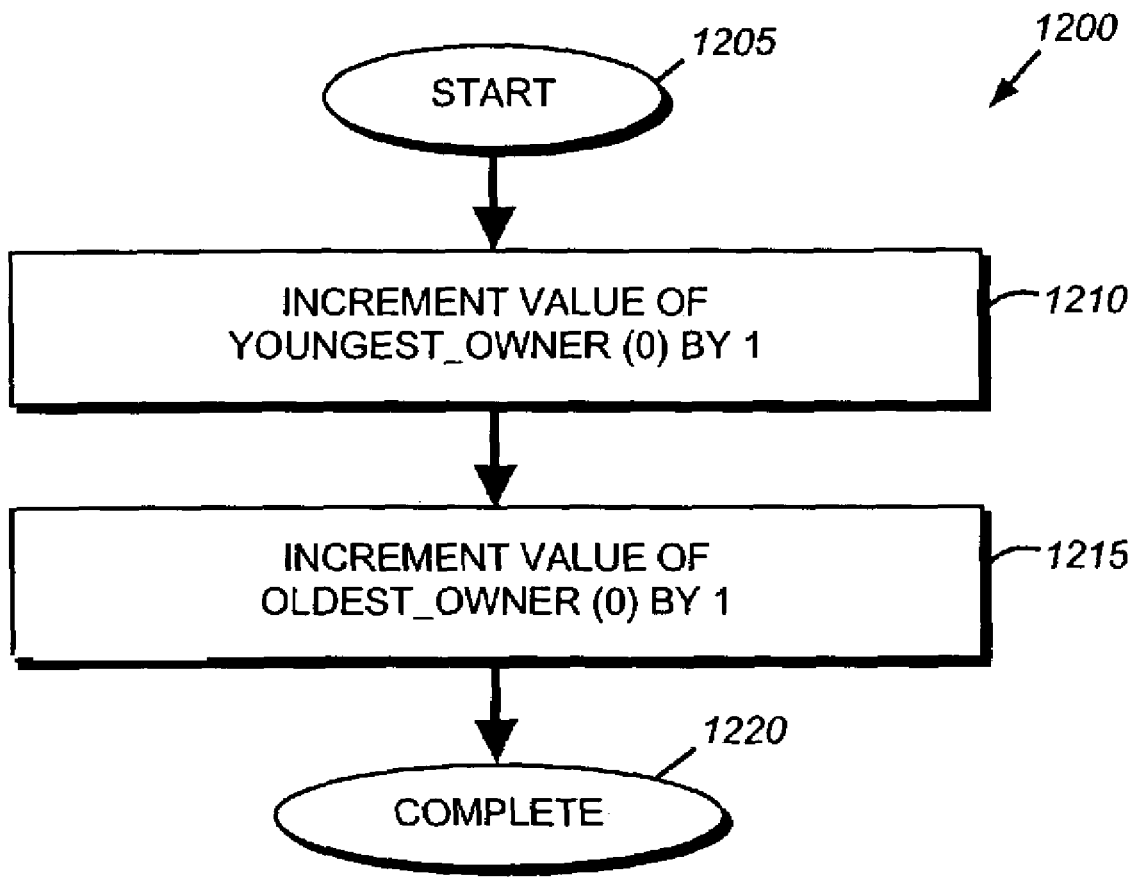
FIG. 12 is a flowchart detailing the steps of a procedure performed when allocating a block in accordance with an embodiment of the present invention.

FIG. 12 is a flowchart detailing a procedure 1200 performed by the file system when allocating a new block. The procedure begins in step 1205 and proceeds to step 1210 where the value of Youngest_Owner(0) is incremented by a value of one.

Similarly, in step 1215, the value of the Oldest_Owner(0) is incremented by a value of one. Thus, the oldest and youngest owners of the newly created block are the active file system. The procedure is then complete in step 1220.

Figure 13:
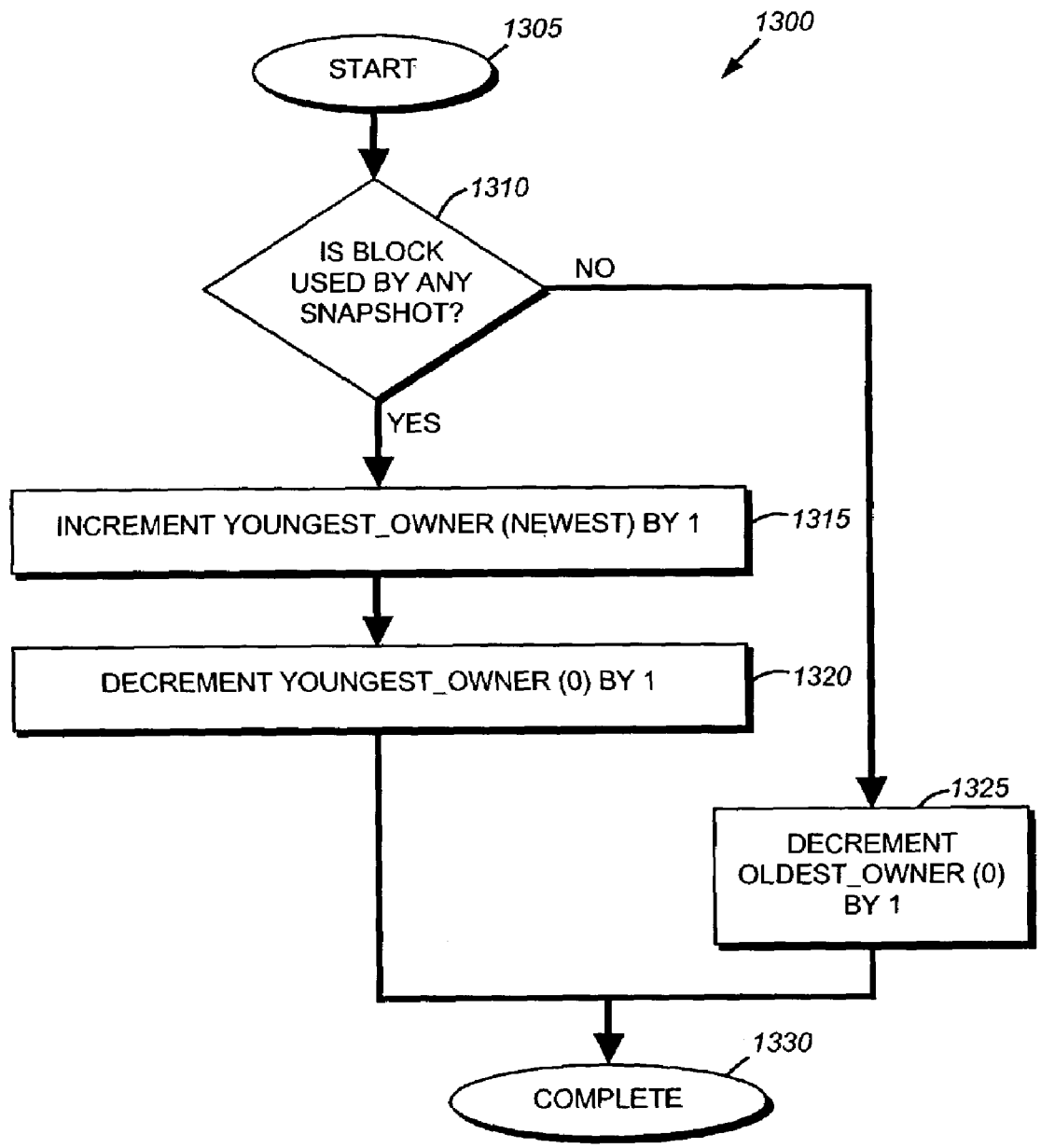
FIG. 13 is a flow-chart detailing the steps of a procedure performed when freeing a block in accordance with an embodiment of the present invention.

A procedure 1300 performed by the file system, in the illustrative embodiment, when freeing a block is shown in FIG. 13. The procedure begins in step 1305 and proceeds to step 1310. In step 1310, the procedure determines if the block to be freed is used by any snapshot. If the block is used by any snapshot the procedure continues to step 1315 where the value of the Youngest_Owner (newest) is incremented by one. In step 1315, the procedure increases the value of the youngest owner variable associated with the newest snapshot by a value of one. Then, in step 1320, the value of the Youngest_Owner (0) is decremented by one. The procedure then continues and is complete in step 1330. However, if in step 1310 it is determined that the block is not used by any snapshot, the procedure branches to step 1325 with a value of the Oldest_Owner (0) is decremented by a value of one. From step 1325, the procedure then completes in step 1330.

Thus, by performing the various procedures described in conjunction with FIGS. 9–13, the file system is able to maintain up to date values of the number of blocks that have each snapshot as its youngest and/or oldest owner. A snapshot inquiry command will thus execute substantially faster as it will not require the manual calculation of each of these values, but will instead simply need to retrieve the storage values from the appropriate FSinfo blocks stored on disk.

Figure 14:
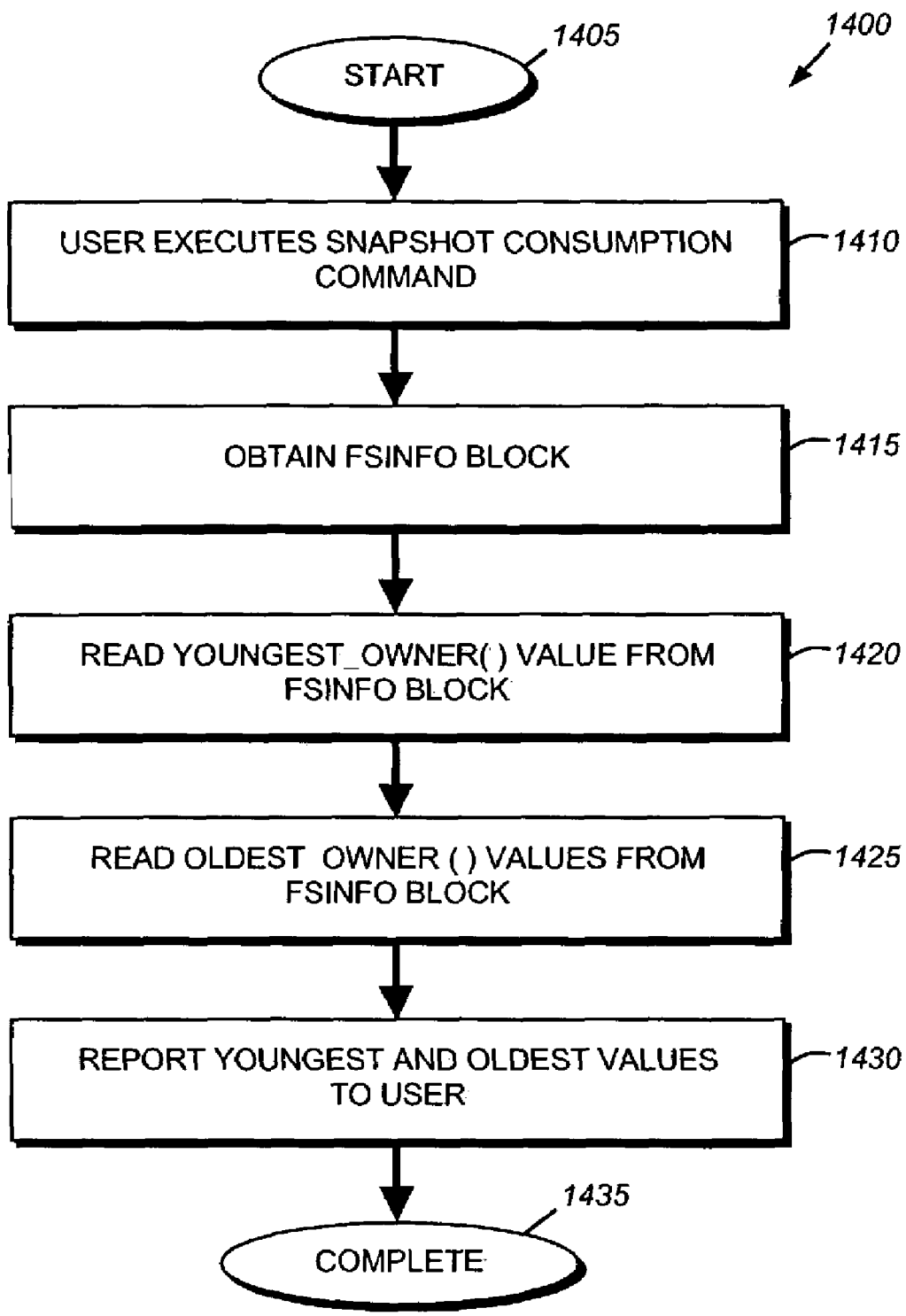
FIG. 14 is a flowchart of an exemplary snapshot consumption command procedure in accordance with an illustrative embodiment of the present invention.

For example, FIG. 14 is a flowchart of an illustrative procedure 1400 performed by a snapshot consumption command using the teachings of the present invention. The procedure 1400 begins in step 1405 and proceeds to step 1410 where a user or administrator executes a snapshot consumption command. This may be accomplished via, for example, a command line interface (CLI) or a graphical user interface (GUI). In response, the storage operating system obtains the Fsinfo block, or other associated metadata block, associated with the selected snapshot in step 1415. In the illustrative embodiment, a copy of the Fsinfo block is stored in memory. However, in alternate embodiments, the Fsinfo block may be read from disk or some other persistent storage. Then, in step 1420, the procedure reads the Youngest_Owner( ) information from the FSinfo block. Similarly, in step 1425, the Oldest_Owner( ) information is read from the FSinfo block. The procedure then reports the oldest and youngest owner information to the user in step 1430. This may be accomplished by printing to a terminal or by displaying the data in a graphical window. The procedure is then complete (step 1435).

In prior art systems, the process would need to manually calculate the youngest and oldest owner values during the execution of the command, which could take substantial amounts of time. The read operations in steps 1415–1425, described above, can be performed with little delay and, as the youngest and oldest owner values are kept up to date by the various procedures described above, the required data is easily accessible.

Another advantage of the present invention is the capability to calculate which blocks a snapshot is the unique owner thereof. A snapshot is the unique owner of a block if it is both the youngest and oldest owner of the block. In other words, the intersection of the set of youngest owner blocks and the set of oldest owner blocks is the set of unique blocks. By calculating the number of unique blocks associated with a snapshot, a determination may be made as to how much space will be freed in a file system should the snapshot be deleted.

Figure 15:
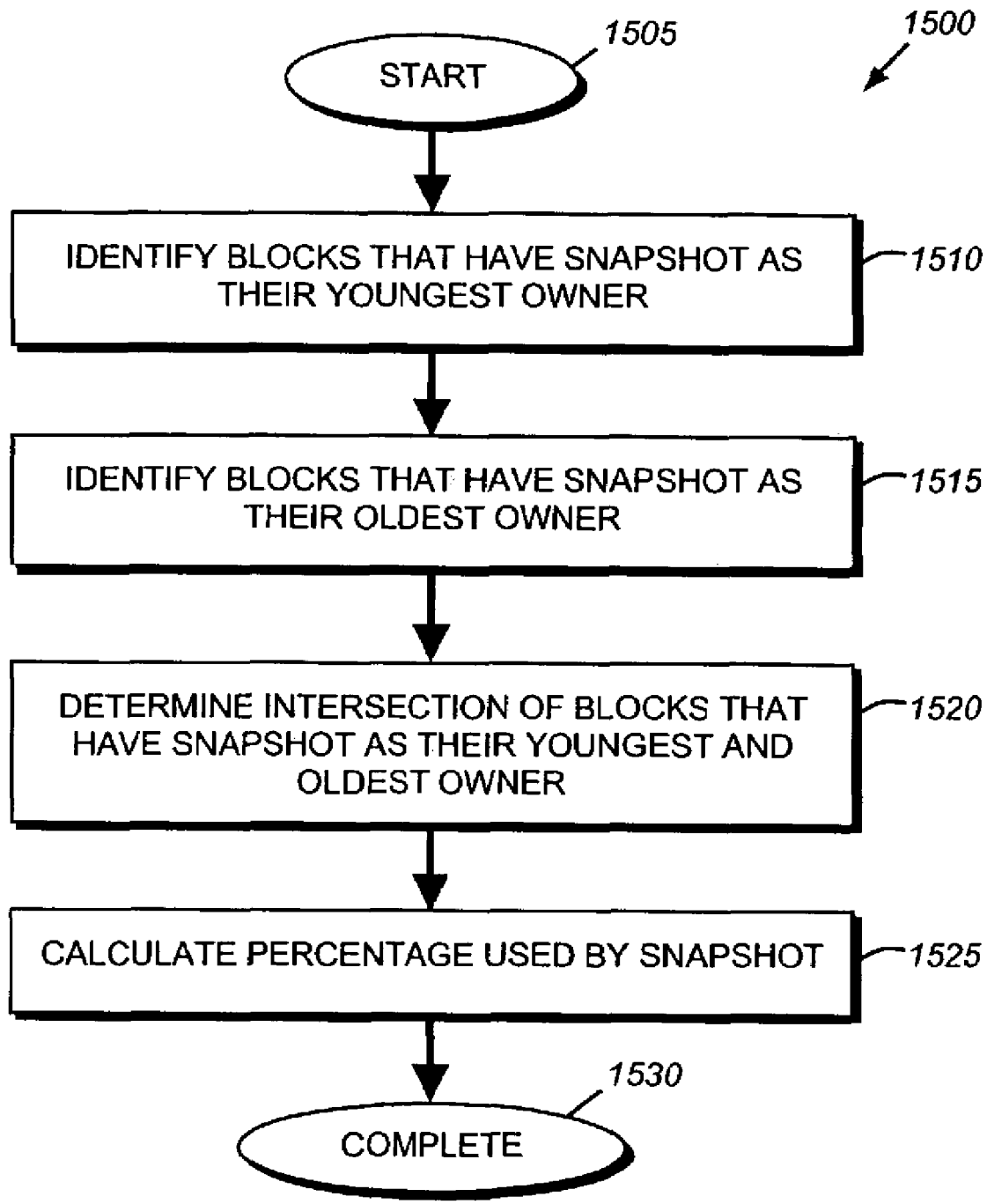
FIG. 15 is a flowchart detailing the steps of a procedure for calculating the space used by a given snapshot in accordance with an embodiment of the present invention.

An exemplary procedure 1500 for calculating the number of unique blocks in a snapshot is shown in FIG. 15. The procedure begins in step 1505 and proceeds to step 1510, where the blocks that have the given snapshot as their youngest owner are identified. The procedure then, in step 1515, identifies those blocks that have the snapshot as their oldest owner. The intersection of these two sets, i.e., those blocks that have the snapshot as both their oldest and youngest owners, is then determined in step 1520. These blocks represent those blocks that are unique to this snapshot, i.e., only are allocated appear in this snapshot and in no others, including the active file system. Using the number of blocks calculated in step 1520 and the number of blocks existing in the file system, the procedure then calculates a percentage of the entire file system that is unique to this snapshot in step 1525. For example, if there are 252 blocks that are unique to the snapshot and 1,000,000 blocks in the file system, the snapshot uses 252/1000000 or 0.025% of the file system. The procedure is then complete in step 1530. By using the procedure 1500, the storage operating system or user may determine how many blocks would be freed by deleting a given snapshot.

To again summarize, the present invention maintains an on-the-fly account of the youngest and oldest owners of each of the snapshots associated with a storage system. These values are initially calculated by an update process and are written, in the illustrative embodiment, to a specific block on disk. The file system then maintains and updates these values in response to various file system commands including, for example, the creation and/or deletion of snapshots and the freeing and allocation of blocks.

The foregoing description has been directed to specific embodiments of this invention. It will be apparent, however, that other variations and modifications may be made to the described embodiments, with the attainment of some or all of their advantages. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for on-the-fly block accounting in a file system, the method comprising the steps of:
    generating an initial accounting for each snapshot associated with the file system, the initial accounting identifying a youngest owner count;
    performing, in response to creating a snapshot, a snapshot creation accounting procedure;
    performing, in response to deleting a snapshot, a snapshot deletion accounting procedure;
    performing, in response to freeing a block, a free block accounting procedure; and
    performing, in response to allocating a block, a block allocation accounting procedure.

2. The method of claim 1 wherein the youngest owner count comprises a value identifying a number of blocks in the file system having a particular snapshot as their youngest owner.

3. The method of claim 1 wherein the initial accounting further comprises identifying, for each of one or more snapshots in the file system, an oldest owner count.

4. The method of claim 3 wherein the oldest owner count comprises a value identifying a number of blocks in the file system having a particular snapshot as their oldest owner.

5. The method of claim 1 wherein an active file system is a snapshot associated with the file system.

6. The method of claim 1 wherein the youngest owner count is stored in non-volatile storage.

7. The method of claim 6 wherein the non-volatile storage comprises a disk.

8. The method of claim 1 wherein the youngest owner count is stored in a predetermined location on a storage device.

9. The method of claim 8 wherein the predetermined location comprises a file system information block associated with a particular snapshot.

10. A method for on-the-fly block accounting in a file system, the method comprising the steps of:
    generating an initial accounting for each snapshot associated with the file system, the initial accounting identifying a youngest owner count;
    performing, in response to creating a snapshot, a snapshot creation accounting procedure including
        setting the youngest owner count associated with a newly created snapshot to zero,
        setting an oldest owner count associated with a newly created snapshot to a number identifying a count of blocks in the file system that have an active file system as their oldest owner, and
        setting the oldest owner count associated with the active file system to a value of zero; and
    performing, in response to deleting a snapshot, a snapshot deletion accounting procedure;
    performing, in response to freeing a block, a free block accounting procedure; and
    performing, in response to allocating a block, a block allocation accounting procedure.

11. The method of claim 1 wherein the step of performing a snapshot deletion accounting procedure further comprises the steps of:
    determining, for each block used by the deleted snapshot, whether the block is used in a next youngest snapshot.

12. The method of claim 3 wherein the step of performing a free block accounting procedure further comprises the steps of:
    incrementing the youngest owner associated with a newly created snapshot by 1; and
    decrementing the oldest owner count of the active file system by 1.

13. The method of claim 3 wherein the step of performing a block allocation accounting procedure further comprises the steps of:
    incrementing the youngest owner count of the active file system by 1; and
    increasing the oldest owner count of the active file system by 1.

14. The method of claim 1 wherein an active file system of the file system comprises a snapshot.

15. A method for on-the-fly block accounting for a file system, the method comprising the steps of:
    calculating, for a snapshot associated with the file system, a youngest owner count; and
    updating, in response to a file system operation, the youngest owner count.

16. The method of claim 15 wherein the youngest owner count identifies a number of blocks in the file system having the snapshot as their youngest owner.

17. The method of claim 15 wherein an active file system is a snapshot.

18. The method of claim 15 wherein the file system operation comprises a create snapshot command.

19. A method for on-the-fly block accounting for a file system, the method comprising the steps of:

calculating, for a snapshot associated with the file system, an oldest owner count; and updating, in response to a file system operation, the oldest owner count.

20. The method of claim 19 wherein the oldest owner count identifies a number of blocks in the file system having the snapshot as their oldest owner.

21. The method of claim 19 wherein an active file system is a snapshot.

22. The method of claim 19 wherein the file system operation comprises a create snapshot command.

23. A method for on-the-fly block accounting in a file system, the method comprising the steps of:

generating an initial accounting for each snapshot associated with the file system, the initial accounting identifying a youngest owner count for each snapshot, where the youngest owner count counts a block if a snapshot uses the block and no newer snapshot uses the block; and identifying an oldest owner count for each snapshot associated with the file system, where the oldest owner count counts a block if a snapshot uses the block and no older snapshot uses the block.

24. The method of claim 23, further comprising:
generating a new snapshot; and
in response to the new snapshot, updating the accounting of the youngest owner count and the oldest owner count.

25. An apparatus for on-the-fly block accounting in a file system, comprising:

means for generating an initial accounting for each snapshot associated with the file system, the initial accounting identifying a youngest owner count for each snapshot, where the youngest owner count counts a block if a snapshot uses the block and no newer snapshot uses the block; and means for identifying an oldest owner count for each snapshot associated with the file system, where the oldest owner count counts a block if a snapshot uses the block and no older snapshot uses the block.

26. The apparatus of claim 25, further comprising:
means for generating a new snapshot; and
in response to the new snapshot, means for updating the accounting of the youngest owner count and the oldest owner count.

27. The method of claim 23, further comprising:
deleting a snapshot; and
in response to deleting the snapshot, determining for each block used by the deleted snapshot, whether the block is used in a next youngest snapshot.

28. The method of claim 23, further comprising:
freeing a block; and
in response to freeing the block, incrementing the youngest owner associated with a newly created snapshot by 1, and decrementing the oldest owner count of an active file system by 1.

29. The method of claim 23, further comprising:
allocating a block; and
in response to allocating the block, incrementing the youngest owner count of an active file system by 1, and increasing the oldest owner count of the active file system by 1.

30. The apparatus of claim 25, further comprising:
means for deleting a snapshot; and
in response to deleting the snapshot, means for determining for each block used by the deleted snapshot, whether the block is used in a next youngest snapshot.

31. The apparatus of claim 25, further comprising:
means for freeing a block; and
in response to freeing the block, means for incrementing the youngest owner associated with a newly created snapshot by 1, and decrementing the oldest owner count of an active file system by 1.

32. The apparatus of claim 25, further comprising:
means for allocating a block; and
in response to allocating the block, means for incrementing the youngest owner count of an active file system by 1, and increasing the oldest owner count of the active file system by 1.

33. A system for on-the-fly block accounting in a file system, comprising:

a storage system;
a memory stored within the storage system;
an operating system stored within the memory, the operating system configured to generate an initial accounting for each snapshot associated with the file system, the initial accounting identifying a youngest owner count, where the youngest owner count counts a block if a snapshot uses the block and no newer snapshot uses the block; and the operating system further configured to identify an oldest owner count for each snapshot associated with the file system, where the oldest owner count counts a block if a snapshot uses the block and no older snapshot uses the block.

34. The system of claim 33, further comprising:
the file system configured to generate a new snapshot; and
in response to the new snapshot, the operating system configure to update the $\alpha$-counting of the youngest owner count and the oldest owner count.

35. The system of claim 33, further comprising:
the file system configured to delete a snapshot; and
in response to deleting the snapshot, the operating system configured to determine for each block used by the deleted snapshot, whether the block is used in a next youngest snapshot.

36. The system of claim 33, further comprising:
the file system configured to free a block; and
in response to freeing the block, the operating system configured to increment the youngest owner associated with a newly created snapshot by 1, and decrement the oldest owner count of an active file system by 1.

37. The system of claim 33, further comprising:
the file system configured to allocate a block; and
in response to allocating the block, the operating system configured to increment the youngest owner count of an active file system by 1, and increase the oldest owner count of the active file system by 1.

38. A method for on-the-fly block accounting in a file system, the method comprising the steps of:

generating an initial accounting for each snapshot associated with the file system, the initial accounting identifying a youngest owner count, where the youngest owner count counts a block if a snapshot uses the block and no newer snapshot uses the block;

identifying an oldest owner count for each snapshot associated with the file system, where the oldest owner count counts a block if a snapshot uses the block and no older snapshot uses the block; and in response to a file system command, updating the initial accounting by determining a new youngest owner count and a new oldest owner count.

\* \* \* \* \*

UNITED STATES PATENT AND TRADEMARK OFFICE
CERTIFICATE OF CORRECTION

| | | |
|---|---|---|
| PATENT NO. | : 7,111,021 B1 | Page 1 of 1 |
| APPLICATION NO. | : 10/394859 | |
| DATED | : September 19, 2006 | |
| INVENTOR(S) | : Blake H. Lewis | |

It is certified that error appears in the above-identified patent and that said Letters Patent is hereby corrected as shown below:

Col. 16, line 32 is corrected as shown:
configure<u>d</u> to update the ~~a counting~~ <u>accounting</u> of the youngest Signed and Sealed this Thirteenth Day of September, 2011

David J. Kappos
*Director of the United States Patent and Trademark Office*